United States Patent
Przygienda

(10) Patent No.: US 10,205,787 B2
(45) Date of Patent: Feb. 12, 2019

(54) METHOD, SYSTEM, AND APPARATUS FOR REDUCING THE SIZE OF ROUTE UPDATES

(71) Applicant: Juniper Networks, Inc., Sunnyvale, CA (US)

(72) Inventor: Antoni B. Przygienda, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 62 days.

(21) Appl. No.: 15/210,856

(22) Filed: Jul. 14, 2016

(65) Prior Publication Data

US 2018/0020060 A1    Jan. 18, 2018

(51) Int. Cl.
*H04L 29/08* (2006.01)
*H04L 12/751* (2013.01)

(52) U.S. Cl.
CPC ............ *H04L 67/141* (2013.01); *H04L 45/02* (2013.01); *H04L 67/10* (2013.01); *H04L 67/145* (2013.01)

(58) Field of Classification Search
CPC ...... H04L 67/141; H04L 67/10; H04L 67/145
USPC ......................................................... 709/227
See application file for complete search history.

(56) References Cited

U.S. PATENT DOCUMENTS

| | | | | |
|---|---|---|---|---|
| 7,599,283 B1* | 10/2009 | Varier | ................... | H04L 45/586 370/216 |
| 7,903,666 B1* | 3/2011 | Kumar | ................... | H04L 45/02 370/395.31 |
| 8,705,513 B2* | 4/2014 | Van Der Merwe | ..... | H04L 47/72 370/351 |
| 8,717,909 B1* | 5/2014 | Shekhar | ................... | H04L 45/04 370/216 |
| 8,929,402 B1* | 1/2015 | Hughes | ................... | H04L 69/04 370/477 |
| 9,036,662 B1* | 5/2015 | Hughes | ................... | H04L 69/04 370/477 |
| 9,491,092 B1* | 11/2016 | Bickhart | ................. | H04L 45/26 |
| 9,548,921 B2* | 1/2017 | Kannan | ................... | H04L 45/56 |
| 9,549,048 B1* | 1/2017 | Hughes | ................... | H04L 69/04 |
| 2002/0037035 A1* | 3/2002 | Singh | ...................... | H03M 7/30 375/240 |

(Continued)

OTHER PUBLICATIONS

Antoni B. Przygienda; Method, System, and Apparatus for Reducing the Size of Route Updates; U.S. Appl. No. 15/210,856, filed Jul. 14, 2016.

(Continued)

*Primary Examiner* — Nicholas R Taylor
*Assistant Examiner* — Chong G Kim
(74) *Attorney, Agent, or Firm* — FisherBroyles, LLP

(57) ABSTRACT

The disclosed method may include (1) establishing a communication session between a plurality of network nodes to enable the plurality of network nodes to exchange route updates with one another, and then during the communication session, (2) detecting, at one of the network nodes, at least one route update to send to another one of the network nodes, (3) compressing, at the network node, the route update to reduce an amount of data included in the route update, and then upon compressing the route update, (4) sending the compressed route update to the other network node to enable the other network node to forward traffic along a path whose route is advertised in the compressed route update. Various other methods, systems, and apparatuses are also disclosed.

14 Claims, 5 Drawing Sheets

(56) References Cited

U.S. PATENT DOCUMENTS

| | | | | |
|---|---|---|---|---|
| 2003/0198250 A1* | 10/2003 | Hakenberg | ............... | H04L 29/06 370/457 |
| 2004/0071096 A1* | 4/2004 | Na | ........................ | H04L 1/0029 370/252 |
| 2004/0114634 A1* | 6/2004 | Liu | ........................ | H04L 63/045 370/521 |
| 2005/0160184 A1* | 7/2005 | Walsh | ................. | H04L 12/1868 709/247 |
| 2005/0169364 A1* | 8/2005 | Singh | ........................ | H03M 7/30 375/240 |
| 2006/0235992 A1* | 10/2006 | Matias | .............. | H04L 29/06027 709/236 |
| 2006/0268932 A1* | 11/2006 | Singh | .................. | H04L 12/4633 370/468 |
| 2007/0002850 A1* | 1/2007 | Guichard | ................ | H04L 45/50 370/389 |
| 2007/0115151 A1* | 5/2007 | Singh | ........................ | H03M 7/30 341/50 |
| 2008/0320171 A1* | 12/2008 | Walsh | ................. | H04L 12/1868 709/247 |
| 2009/0052452 A1* | 2/2009 | Patel | ........................ | H04L 45/04 370/392 |
| 2009/0187673 A1* | 7/2009 | Ramjee | ............... | H04L 67/2828 709/247 |
| 2010/0103953 A1* | 4/2010 | Matias | .............. | H04L 29/06027 370/477 |
| 2010/0124239 A1* | 5/2010 | Hughes | ................... | H04L 69/04 370/477 |
| 2010/0198913 A1* | 8/2010 | Garcia-Luna-Aceves | ................... | G06F 12/1483 709/203 |
| 2010/0208744 A1* | 8/2010 | Shaikh | .................... | H04L 45/02 370/408 |
| 2010/0329256 A1* | 12/2010 | Akella | ................ | H04L 12/4625 370/392 |
| 2011/0176543 A1* | 7/2011 | Guo | ....................... | H04L 45/745 370/389 |
| 2011/0317547 A1* | 12/2011 | Baudoin | ............... | H04L 65/607 370/216 |
| 2013/0201316 A1* | 8/2013 | Binder | .................... | H04L 67/12 348/77 |
| 2013/0279524 A1* | 10/2013 | Guo | ....................... | H04L 1/0041 370/474 |
| 2015/0074291 A1* | 3/2015 | Hughes | .................... | H04L 69/04 709/247 |
| 2016/0006663 A1* | 1/2016 | Zhang | ..................... | H04L 47/33 709/234 |
| 2016/0105358 A1* | 4/2016 | Kannan | ................... | H04L 45/56 709/238 |
| 2016/0179628 A1* | 6/2016 | Kolte | .................. | G06F 11/1453 713/175 |
| 2016/0381188 A1* | 12/2016 | Fekri | ....................... | H04L 69/04 370/230 |
| 2017/0155587 A1* | 6/2017 | Bannister | .............. | H04L 45/748 |

OTHER PUBLICATIONS

Dictionary coder, https://en.wikipedia.org/wiki/Dictionary_coder, as accessed May 26, 2016, Wikipedia, (May 31, 2005).

Jeffrey M. Haas; Method, System, and Apparatus for Improving Forwarding Capabilities During Route Convergence; U.S. Appl. No. 15/083,359, filed Mar. 29, 2016.

* cited by examiner

METHOD, SYSTEM, AND APPARATUS FOR REDUCING THE SIZE OF ROUTE UPDATES

BACKGROUND

Route updates often involve a lot of data transfer. For example, Border Gateway Protocol (BGP) convergence may involve the transfer of various route-update messages that include redundant and/or repetitious data. Additionally or alternatively, these route-update messages may be transferred in connection with a long series of superfluous markers.

As a result, traditional route-update messages may lead to a variety of problems. For example, traditional route-update messages may cause heavy network traffic that necessitates the consumption of a lot of resources and/or processing power among network devices. Additionally or alternatively, growing volume of traditional route-update messages may cause control traffic Input/Output (I/O) bottlenecks within network devices. The instant disclosure, therefore, identifies and addresses a need for methods, systems, and apparatuses for reducing the size of route updates.

SUMMARY

As will be described in greater detail below, the instant disclosure generally relates to methods, systems, and apparatuses for reducing the size of route updates. In one example, a computer-implemented method for accomplishing such a task may include (1) establishing a communication session between a plurality of network nodes to enable the plurality of network nodes to exchange route updates with one another, and then during the communication session, (2) detecting, at one of the network nodes, at least one route update to send to another one of the network nodes, (3) compressing, at the network node, the route update to reduce an amount of data included in the route update, and then upon compressing the route update, (4) sending the compressed route update to the other network node to enable the other network node to forward traffic along a path whose route is advertised in the compressed route update.

Similarly, a system incorporating the above-described apparatus may include (1) a communication module, stored in memory, that establishes a communication session between a plurality of network nodes to enable the plurality of network nodes to exchange route updates with one another, and then during the communication session, (2) a detection module, stored in memory, detects at least one route update to send from one of the network nodes to another one of the network nodes, (3) a compression module, stored in memory, that compresses the route update to reduce an amount of data included in the route update, and (4) the communication module sends the compressed route update to the other network node to enable the other network node to forward traffic along a path whose route is advertised in the compressed route update. This system may also include at least one physical processor that executes the communication module, the detection module, and the compression module.

A corresponding apparatus may include (1) a storage device that stores an adaptive compression algorithm that facilitates removal of certain patterns of data from route updates sent from a network node to another network node and (2) at least one physical processor communicatively coupled to the storage device, wherein the physical processor (A) establishes a communication session between the network node and the other network node to enable the network node and the other network node to exchange route updates with one another, and then during the communication session, (B) detects, at the network node, at least one route update to send to the other network node, (C) compresses, at the network node, the route update to reduce an amount of data included in the route update, and then (D) sends the compressed route update to the other network node to enable the other network node to forward traffic along a path whose route is advertised in the compressed route update.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
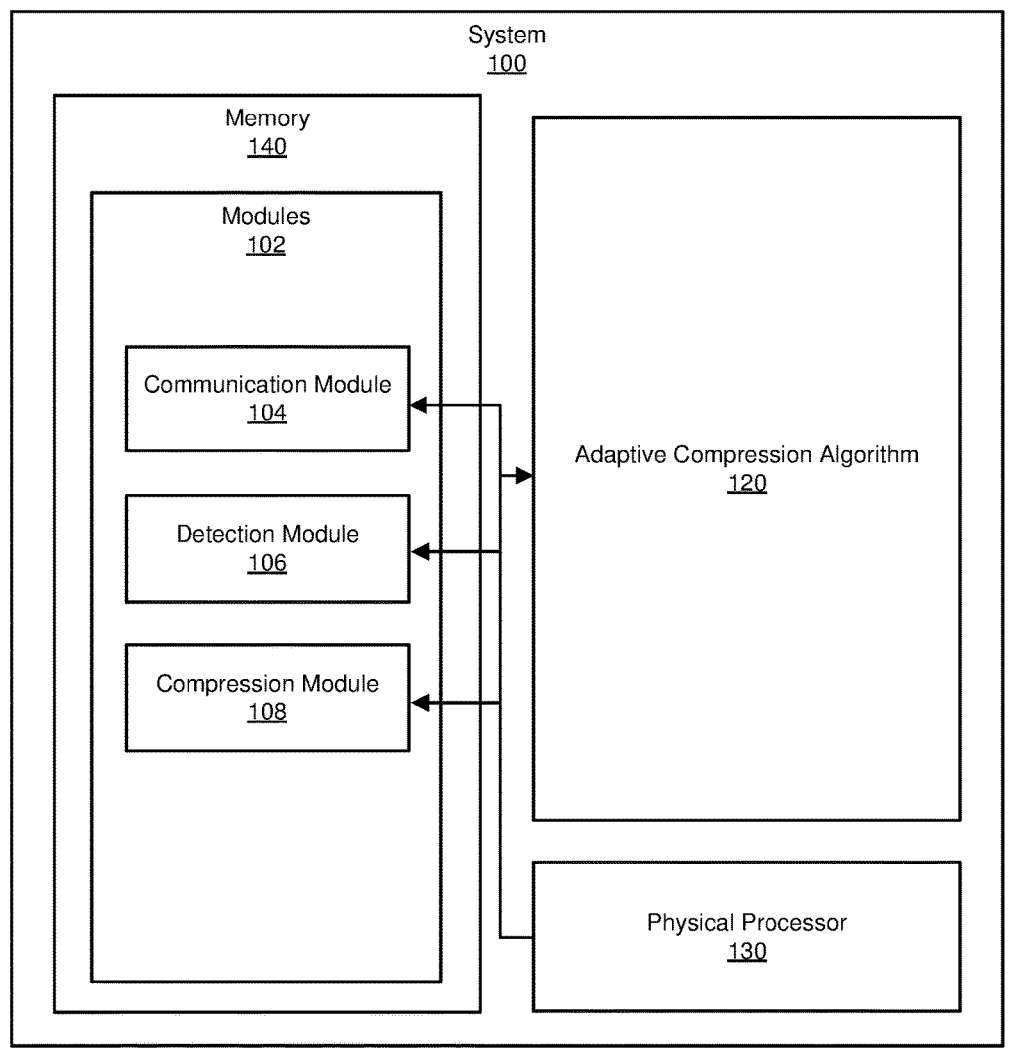
FIG. 1 is a block diagram of an exemplary apparatus for reducing the size of route updates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for reducing the size of route updates. As will be explained in greater detail below, embodiments of the instant disclosure may be able to reduce the amount of network traffic needed to exchange route-update messages among network devices. Additionally or alternatively, embodiments of the instant disclosure may be able to decrease the amount of processing power consumed by certain network devices during the exchange of route-update messages. Moreover, embodiments of the instant disclosure may alleviate and/or mitigate control traffic I/O bottlenecks within network devices.

Figure 2:
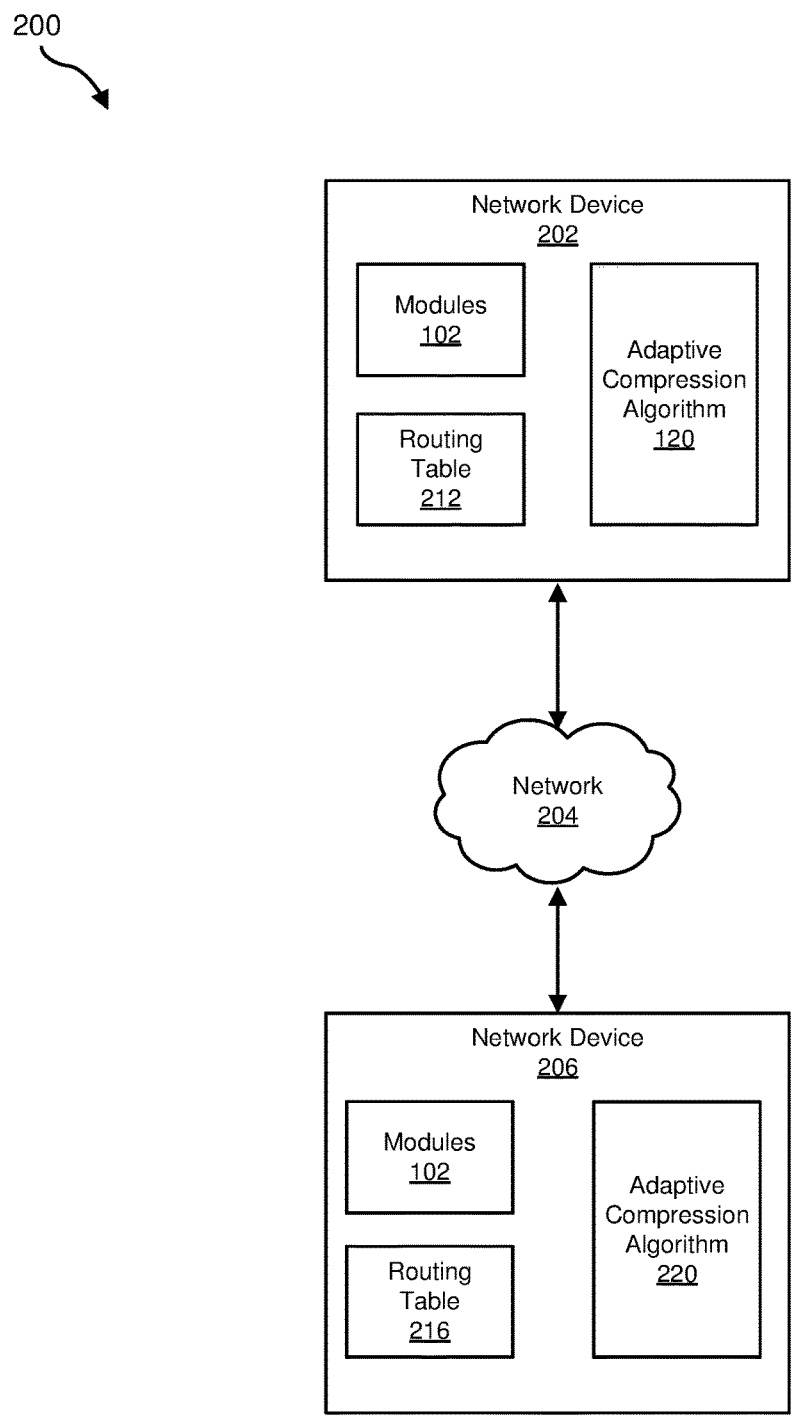
FIG. 2 is a block diagram of an exemplary apparatus for reducing the size of route updates.

The following will provide, with reference to FIGS. 1 and 2, examples of systems and/or apparatuses that reduce the size of route updates. The discussion corresponding to FIG. 3 will provide a detailed description of an exemplary method for reducing the size of route updates. The discussion corresponding to FIG. 4 will provide a detailed description of an exemplary representation of traffic volume that is compressed over time. Finally, the discussion corresponding to FIG. 5 will provide numerous examples of systems that may include the components shown in FIGS. 1 and 2.

FIG. 1 is a block diagram of an exemplary system 100 for reducing the size of route updates. As illustrated in this figure, exemplary system 100 may include one or more modules 102 for performing one or more tasks. As will be explained in greater detail below, modules 102 may include a communication module 104, a detection module 106, and/or a compression module 108. Although illustrated as separate elements, one or more of modules 102 in FIG. 1 may represent portions of a single module, application, and/or framework.

In certain embodiments, one or more of modules 102 in FIG. 1 may represent one or more software applications or programs that, when executed by a computing device, cause the computing device to perform one or more tasks. For example, as will be described in greater detail below, one or more of modules 102 may represent modules stored and/or configured to run on one or more computing devices, such as any of the devices illustrated in FIG. 2 (e.g., network device 202 and/or network device 206) and/or computing system 500 in FIG. 5. One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer readable instructions. In one example, memory 140 may store, load, and/or maintain one or more of modules 102. Additionally or alternatively, memory 140 may store, load, and/or maintain an adaptive compression algorithm, a compressor, and/or a compression dictionary. Examples of memory 140 include, without limitation, Random Access Memory (RAM), Read Only Memory (ROM), flash memory, Hard Disc Drives (HDDs), Solid-State Drives (SSD), optical disk drives, caches, variations or combinations of one or more of the same, and/or any other suitable memory.

As illustrated in FIG. 1, exemplary system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to reduce the size of route updates. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may also include and/or store one or more adaptive compression algorithms, such as adaptive compression algorithm 120. The term "adaptive compression algorithm," as used herein, generally refers to any type or form of algorithm, dictionary, library, and/or compressor that reduces and/or facilitates reducing the size of route updates. In one example, adaptive compression algorithm 120 may include and/or represent the "zlib" compression library (using, e.g., the "DEFLATE" compression algorithm). Additionally or alternatively, adaptive compression algorithm 120 may adapt and/or change over time based at least in part on its history of use and/or machine learning. Additional examples of adaptive compression algorithm 120 include, without limitation, lossless compression algorithms, Lempel-Ziv compression algorithms, portions of one or more of the same, combinations or variations of one or more of the same, and/or any other suitable adaptive compression algorithm.

In some examples, certain network devices may have different adaptive compression algorithms for compressing the route updates. For example, one network device may have one adaptive compression algorithm, and another network device may have a different adaptive compression algorithm. As a result, these network devices may produce and/or send compressed route updates that have differing compressions.

Exemplary system 100 in FIG. 1 may be implemented in a variety of ways and/or contexts. For example, all or a portion of exemplary system 100 in FIG. 1 may represent portions of exemplary system 200 in FIG. 2. As shown in FIG. 2, system 200 may include a network device 202 and a network device 206 in communication with one another via network 204. All or a portion of the functionality of modules 102 may be performed by network device 202, network device 206, and/or any other suitable computing device (whether or not illustrated in FIG. 2).

As will be described in greater detail below, one or more of modules 102 from FIG. 1 may, when executed by at least one processor of network device 202 or 206, enable network device 202 or 206 to reduce the size of route updates. In one example, network device 202 or 206 may be programmed with one or more of modules 102 that are stored in memory 140 and/or executable by physical processor 130. In this example, network device 202 or 206 may create, build, modify, and/or distribute at least a portion of adaptive compression algorithm 120. For example, network device 202 may send at least a portion of adaptive compression algorithm 120 to network device 206 via network 204. By sending adaptive compression algorithm 120 to network device 206 in this way, network device 202 may enable network device 206 to decompress certain route updates that have been compressed by adaptive compression algorithm 120.

Although FIG. 2 illustrates network devices 202 and 206 as being external to network 204, one or more of these devices may alternatively represent a part of and/or be included in network 204. Moreover, FIG. 2 may illustrate only a portion of system 200 and/or the corresponding network. For example, system 200 may include various other network and/or computing devices that are not necessarily illustrated in FIG. 2.

Network devices 202 and 206 each generally represent any type or form of computing device, system, and/or mechanism that facilitates the flow of network traffic within a network and/or across networks. In some examples, network devices 202 and 206 may each include and/or represent a router (such as a provider edge router, hub router, spoke router, autonomous system boundary router, and/or area border router). Additional examples of network devices 202 and 206 include, without limitation, switches, hubs, modems, bridges, repeaters, gateways, multiplexers, network adapters, network interfaces, network racks, chasses, servers, computing devices, virtual machines running on one or more of the same, portions of one or more of the same, combinations or variations of one or more of the same, and/or any other suitable network devices. The terms "network device" and "network node" may be used interchangeably throughout the instant application.

Network 204 generally represents any type or form of medium and/or architecture that facilitates communication or data transfer. In one example, network 204 may facilitate traffic for subscribers of a service provider. Examples of network 204 include, without limitation, an MPLS network, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a peer network, portions of one or more of the same, combinations or variations of one or more of the same, and/or any other suitable networks. Network 204 may support and/or facilitate communication or data transfer using wireless and/or wired connections. Although FIG. 2 illustrates only a single network, alternative embodiments may include various other networks in addition to network 204. Additionally or alternatively, although FIG. 2 illustrates network 204 as a single entity, network 204 may alternatively include and/or represent a plurality of networks and/or subnetworks.

Figure 3:
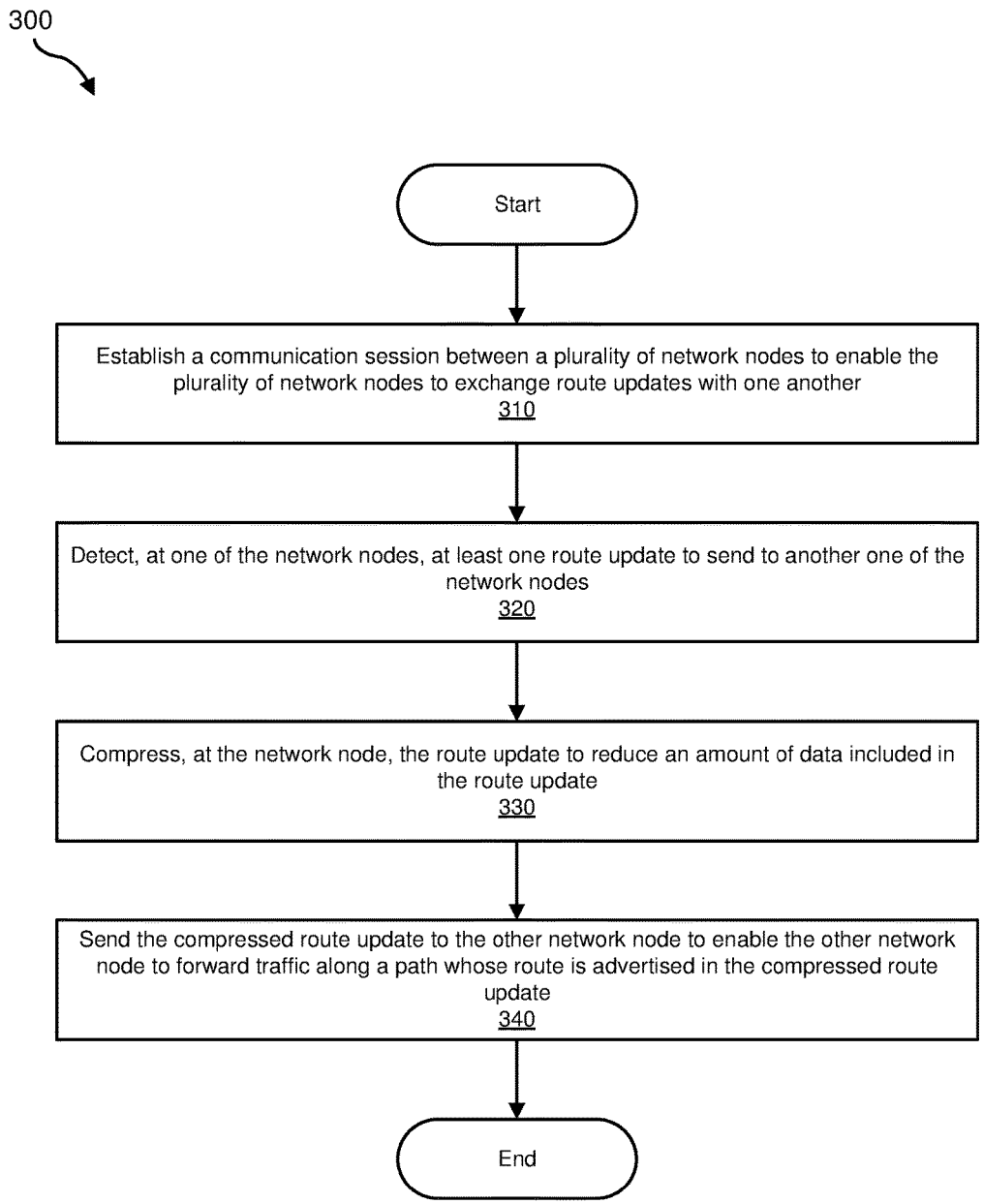
FIG. 3 is a flow diagram of an exemplary method for reducing the size of route updates.

FIG. 3 is a flow diagram of an exemplary computer-implemented method 300 for reducing the size of route updates. The steps shown in FIG. 3 may be performed by any suitable computer-executable code and/or computing system, including system 100 in FIG. 1, system 200 in FIG. 2, computing system 500 in FIG. 5, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may establish a communication session between a plurality of network nodes to enable the plurality of network nodes to exchange route updates with one another. For example, communication module 104 may, as part of network device 202 and/or network device 206, establish a communication session between network device 202 and/or network device 206 via network 204. In this example, the communication session may enable network device 202 and/or network device 206 to exchange route updates with one another.

In some examples, the communication session may include and/or represent a BGP session in which network devices 202 and 206 perform route convergence. The term "convergence" and the phrase "to converge," as used herein, generally refer to the process of updating routes affected by topology changes within a network. In this context, network devices 202 and 206 may fully converge once they have completed exchanging any updates to routes affected by topology changes or network device configuration. In other words, convergence may reach a state of completion when network devices 202 and 206 effectively agree on the desired routing within the network topology. Accordingly, in such examples, the converged network devices may include only routes that are consistent with one another.

The systems described herein may perform step 310 in a variety of ways and/or contexts. In one example, communication module 104 may establish the communication session between network devices 202 and 206 by negotiating certain terms of their connection with one another. For example, communication module 104 may initiate a BGP session between network devices 202 and 206 using a Transmission Control Protocol (TCP) session. In this example, communication module 104 may set up and/or incorporate certain BGP extensions into the BGP session by the means of BGP OPEN messages exchanged over the TCP session.

In one example, communication module 104 may, as part of sending network device 202, notify receiving network device 206 of adaptive compression algorithm 120 that sending network device 202 intends to apply to route updates during the BGP session. Additionally or alternatively, receiving network device 206 may announce its capability and/or willingness to decompress updates subjected to adaptive compression algorithm 120 in an analogous way to sending network device 202. By notifying network device 206 of adaptive compression algorithm 120 in this way, communication module 104 may effectively enable network device 206 to decompress any compressed route updates sent by network device 202 during the BGP session.

Similarly, communication module 104 may, as part of sending network device 206, notify receiving network device 202 of adaptive compression algorithm 220 that sending network device 206 intends to apply to route updates during the BGP session. Additionally or alternatively, receiving network device 202 may announce its capability and/or willingness to decompress updates subjected to adaptive compression algorithm 220 of sending network device 206. By notifying receiving network device 202 of adaptive compression algorithm 220 in this way, communication module 104 may effectively enable receiving network device 202 to decompress any compressed route updates sent by network device 206 during the BGP session.

In some examples, communication module 104 may provide at least a portion of adaptive compression algorithm 120 to network device 206. Additionally and/or alternatively, communication module 104 may notify network device 206 of at least one parameter of adaptive compression algorithm 120 that will or could be applied to route updates. For example, communication module 104 may notify network device 206 of a certain window size of adaptive compression algorithm 120 that will be applied to route updates during the BGP session. Additionally or alternatively, network device 206 may announce the capability to decompress updates subject to at least one parameter restricting the decompression algorithm.

Returning to FIG. 3, at step 320 one or more of the systems described herein may detect, at one of the network nodes, at least one route update to send to another one of the network nodes. For example, detection module 106 may, as part of network device 202, detect one or more route updates to send to network device 206. The term "route," as used herein, generally refers to any type or form of information, data, and/or representation that indicates and/or identifies a path within a network and/or across networks and/or any other element being used for the purpose of BGP database synchronization. For example, a route may include and/or represent a BGP-Labeled Unicast (BGP-LU) element, a MAC carried in BGP Ethernet Virtual Private Network (EVPN), and/or many other elements carried within BGP address families. The term "route update," as used herein, generally refers to any notification and/or message that identifies and/or defines at least one route or BGP database element that is new or has changed in one way or another relative to a previous version.

In one example, a route update may identify and/or define a route that has been affected in one way or another by at least one topology or configuration change within network 204. For example, an administrator may add a network device to network 204 and/or remove a network device from network 204 or reconfigure a BGP import policy. Additionally or alternatively, a physical link in network 204 may suffer a failure that prevents the flow of network traffic via certain paths.

The systems described herein may perform step 320 in a variety of ways and/or contexts. In one example, detection module 106 may detect the route updates based at least in part on a routing table of network device 202. For example, detection module 106 may monitor the routing table for any changes made to the routes stored and/or installed in the routing table. While monitoring the routing table in this way, detection module 106 may detect and/or identify at least one change made to a certain route stored and/or installed in the routing table. Detection module 106 may then create and/or generate a route update that identifies and/or defines the change made to that route.

In another example, detection module 106 may detect the route updates based at least in part on control-plane communications received by network device 202 from other network devices (not necessarily illustrated in FIG. 2). For example, a network device not illustrated in FIG. 2 may send one or more route updates to network device 202. As those route updates arrive at network device 202, detection module 106 may detect and/or identify the route updates.

Returning to FIG. 3, at step 330 one or more of the systems described herein may compress, at the network node, the route update to reduce an amount of data included in the route update. For example, compression module 108 may, as part of network device 202, compress one or more route updates to reduce the amount of data included in those route updates. The result of this compression may include and/or represent a block and/or bundle of compressed route updates.

The systems described herein may perform step 330 in a variety of ways and/or contexts. In one example, compression module 108 may compress the route updates by removing certain patterns of data. For example, compression module 108 may identify a certain pattern of data included in one or more route updates. In this example, compression module 108 may apply adaptive compression algorithm 120 to those route updates. Adaptive compression algorithm 120 may effectively remove that pattern of data from those route updates.

In one example, compression module 108 and/or adaptive compression algorithm 120 may replace that pattern of data with a smaller representation of data. In this example, that smaller representation of data may convey information that, upon decompression, is identical to the pattern of data that was removed from those route updates. Additionally or alternatively, that smaller representation of data may include and/or represent a fewer number of bytes than the pattern of data that was removed from those route updates.

In one example, detection module 106 may identify a minimum threshold that represents a certain amount of data needed to apply the compression by way of adaptive compression algorithm 120. For example, network device 202 may implement a block-mode compression scheme to generate and/or compress blocks and/or bundles of route updates prior to sending the same to network device 206. In this block-mode compression scheme, compression module 108 may wait until a certain amount of data (e.g., a certain number of bytes and/or route updates) is reached in connection with the route updates before applying adaptive compression algorithm 120.

As a specific example, compression module 108 may wait until approximately 8 kilobytes of data has been queued for transmission to network device 206 in the form of route updates. In this example, once that 8-kilobyte threshold has been reached, compression module 108 may compress the corresponding route updates to reduce the amount of data included in those route updates from 8 kilobytes to a smaller number of kilobytes.

In one example, detection module 106 may determine that the amount of data included in the route updates exceeds a maximum message size of a communication protocol used in the communication session. For example, BGP may have a maximum message size of approximately 4 kilobytes. As a result, in the event that the size of the compressed route updates exceeds that 4-kilobyte limit, detection module 106 may determine that those route updates will not fit in a single BGP message. In response to determining that the amount of data included in those route updates exceeds that 4-kilobyte limit, detection module 106 may split and/or assign the data included in those route updates into two or more BGP messages.

In one example, compression module 108 may set a flag of the first BGP message to be sent to network device 206. In this example, the flag may indicate that the route updates have been split into two BGP messages. By setting this flag, compression module 108 may effectively notify network device 206 that the BGP second message that includes the rest of the data from those route updates will arrive at network device 206 shortly after the first BGP message.

In some examples, compression module 108 may collect various route updates prior to applying the adaptive compression algorithm 120. For example, compression module 108 may wait until 10 route updates are ready to be sent to network device 206 before applying adaptive compression algorithm 120. In this example, compression module 108 may compress those 10 route updates into a single BGP message. As a result, those 10 route updates may be summarized into a single BGP compressed update.

In some examples, compression module 108 may apply selective compression to route updates only when a certain amount of data is exchanged between network device 202 and network device 206. For example, detection module 106 may determine that network device 202 is transferring data at a rate of 5 megabits per second to network device 206. In this example, detection module 106 may determine that a data transfer rate of 5 megabits per second exceeds a maximum threshold indicating that compression should be applied to route updates sent to network device 206 at that point in time. In response to this determination, compression module 108 may compress any route updates sent to network device 206 while the data transfer rate exceeds the maximum threshold.

In some examples, compression module 108 may remove certain data and/or elements that do not include any meaningful information from route updates during compression. For example, compression module 108 may remove certain markers from route updates upon applying adaptive compression algorithm 120 to those route updates.

In some examples, compression module 108 may perform the compression across multiple processors. For example, compression module 108 may allocate certain portions of the compression job to one processor on network device 202 and other portions of the compression job to another processor on network device 202. Accordingly, network device 202 may perform this compression job across multiple processors in parallel. Network device 202 may perform this compression job in parallel to the main processing such that this compression job serves as a filter on the I/O channel for updates. Additionally or alternatively, compression module 108 may perform certain portions of the compression job sequentially on a single processor.

Returning to FIG. 3, at step 340 one or more of the systems described herein may send the compressed route update to the other network node to enable the other network node to forward traffic along a path whose route is advertised in the compressed route update. For example, communication module 104 may, as part of network device 202, send one or more route updates to network device 206 to enable network device 206 to forward traffic along paths whose routes are advertised in the compressed route updates. The term "path," as used herein, generally refers to any series of links and/or devices that facilitate communication and/or the flow of traffic between a source and a destination within a network and/or across networks.

The systems described herein may perform step 340 in a variety of ways and/or contexts. In some examples, communication module 104 may send the compressed route updates to network device 206 via network 204. Additionally or alternatively, communication module 104 may send the compressed route updates to network device 206 via the control plane. For example, communication module 104 may send the compressed route updates to network device 206 via BGP. By sending the compressed route updates to network device 206, communication module 104 may enable network device 206 to (1) install and/or use the routes advertised in the compressed route updates and/or (2) modify adaptive compression algorithm 120 based at least in part on the compressed route updates.

Upon receiving the compressed route updates, network device 206 may decompress those route updates by applying at least a portion of adaptive compression algorithm 120 obtained during the establishment of the communication session. Once the route updates have been decompressed, network device 206 may install the routes advertised in those route updates to the routing table. Additionally or alternatively, network device 206 may forward network traffic along the routes advertised in those route updates and/or use the received data for the purpose specified by the corresponding address family.

Adaptive compression algorithm 120 on network device 206 may need to be reset and/or restarted for one reason or another. In one example, network device 202 may experience a failure upon compressing one or more route updates. Unless addressed by way of resetting and/or restarting adaptive compression algorithm 120 on network device 206, this failure may cause disruption to adaptive compression algorithm 120 on network device 206 and/or cause adaptive compression algorithm 120 to desynchronize between network device 202 and network device 206. For example, detection module 106 may detect at least one additional route update to send to network device 206. In this example, compression module 108 may compress the additional route update in an effort to reduce the amount of data included in the additional route update.

However, detection module 106 and/or compression module 108 may determine that the compression of the additional route update results in a failure that causes or would cause the additional route update to exceed a maximum threshold. For example, detection module 106 and/or compression module 108 may determine that the additional route update was too big to fit within the maximum BGP message size and/or within the maximum number of BGP messages per update. In this example, the resulting compressed route update may exceed the permissible BGP update size of a single allowed additional BGP message.

As a result, in an effort to prevent the synchronization, communication module 104 may send that additional route update without any compression to network device 206. In other words, communication module 104 may send an uncompressed version of that additional route update to network device 206. Additionally or alternatively, communication module may send a reset for adaptive compression algorithm 120 to network device 206 in connection with the next compressed route update.

In one example, the reset may represent a portion (such as a bit or flag) of the next compressed route update sent to network device 206. In another example, the reset may include and/or represent a separate BGP message sent to network device 206 in connection with the next compressed route update. Upon receiving the reset, network device 206 may reset adaptive compression algorithm 120 to a previous, stable, and/or synchronized state as directed by network device 202.

In some examples, compression module 108 may measure the compression ratio of adaptive compression algorithm 120 over a certain period of time. Detection module 106 and/or compression module 108 may then determine whether certain route updates are too big to be compressed by adaptive compression algorithm 120 in view of the size constraints of BGP messages. For example, compression module 108 may measure the current compression ratio of adaptive compression algorithm 120 to be approximately 50%. In this example, detection module 106 may detect at least one additional route update to send to network device 206.

Detection module 106 and/or compression module 108 may then determine that the amount of data (e.g., approximately 9 kilobytes) included in the additional route update exceeds a maximum threshold (e.g., approximately 8 kilobytes) due at least in part to the 50% compression ratio. In other words, detection module 106 and/or compression module 108 may determine that the 50% compression ratio would be unlikely to bring the additional route update below the maximum BGP message size of approximately 4 kilobytes. In response to this determination, compression module 108 may refuse to compress the additional route update. As a result, communication module 104 may send the additional route update without any compression to network device 206.

In some examples, compression module 108 may apply compression only to route updates. In contrast, compression module 108 may refuse to compress keepalive messages needed to maintain the communication session in an active and/or live state. For example, detection module 106 may detect a keepalive message to send to network device 206. Since, in this example, compression is applied only to route updates, compression module 108 may refuse to compress the keepalive message. As a result, communication module 104 may send the keepalive message without any compression to network device 206. In doing so, communication module 104 may ensure that (1) the keepalive message reaches network device 206 on time and/or without critical delay and/or (2) the keepalive message facilitates continuation of the communication session.

Figure 4:
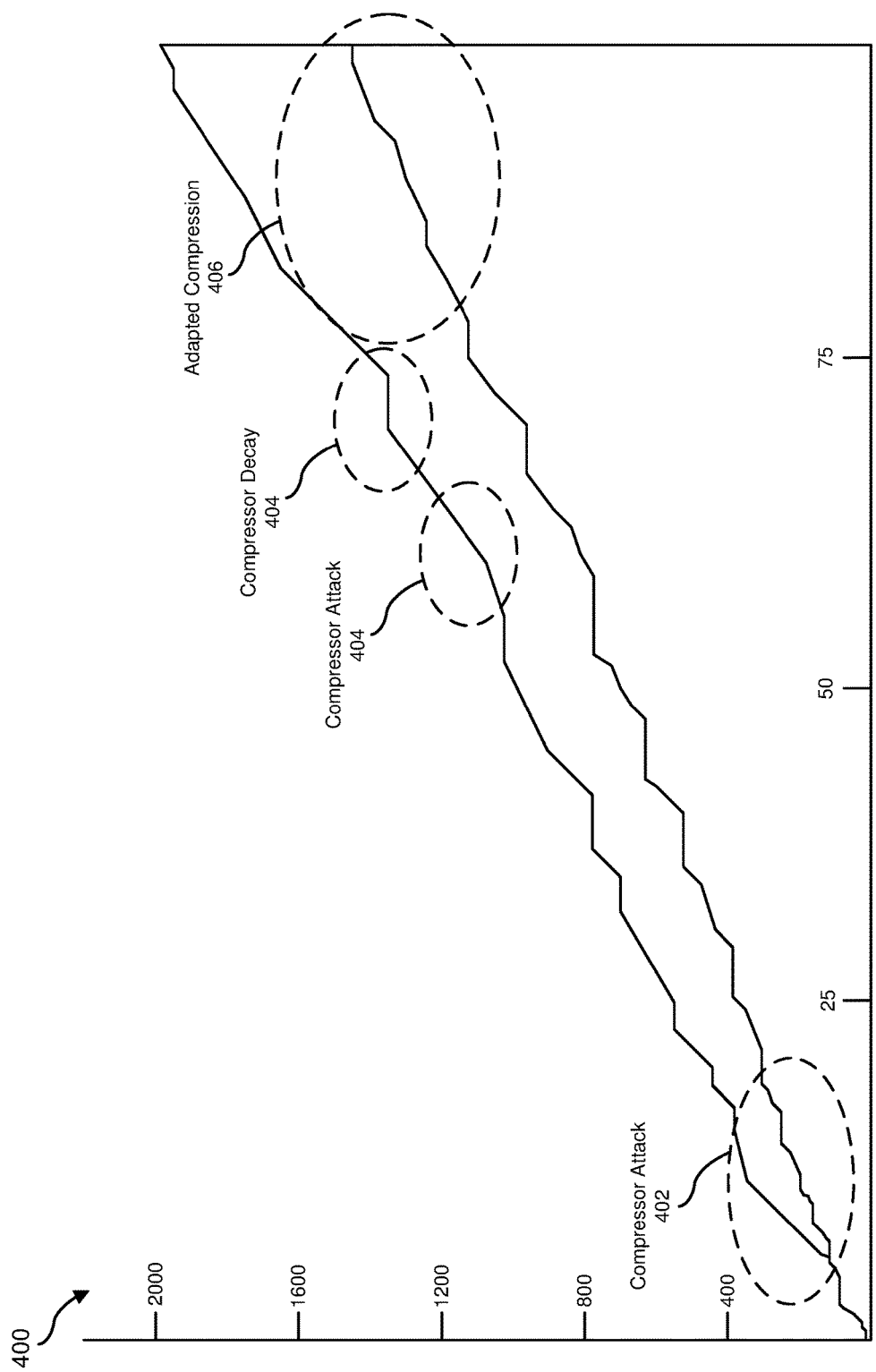
FIG. 4 is an illustration of an exemplary representation of traffic volume that is compressed over time.

FIG. 4 is an illustration of an exemplary representation 400 of traffic volume that is compressed over time. As illustrated in FIG. 4, exemplary representation 400 may demonstrate certain differences between the total amount of uncompressed traffic and the total amount of compressed traffic. The x-axis of exemplary representation 400 may represent the passing of time (in, e.g., units of seconds), and the y-axis of exemplary representation 400 may represent traffic volume (in, e.g., number of bytes in all the route updates).

In this example, the positively sloped lines may represent the total amount of uncompressed bytes in route updates sent by network device 202 to network device 206 and the total amount of bytes in compressed route updates sent by network device 202 to network device 206. More specifically, as the lines diverge at compressor attacks 402, the upper line may represent the total amount of uncompressed bytes in route updates, and the lower line may represent the total amount of bytes in compressed route updates. After experiencing a sequence of compressor attacks 402 and decays 406 (not all of which are necessarily labelled and/or identified in FIG. 4), the compressor may become fully adapted and/or stabilized for smoothing and/or compressing control-plane traffic destined for network device 206. Each compressor attack may be followed by a compressor decay. In other words, the compressor may be operational after attacking and until decaying, and the compressor may be non-operational while decaying.

Figure 5:
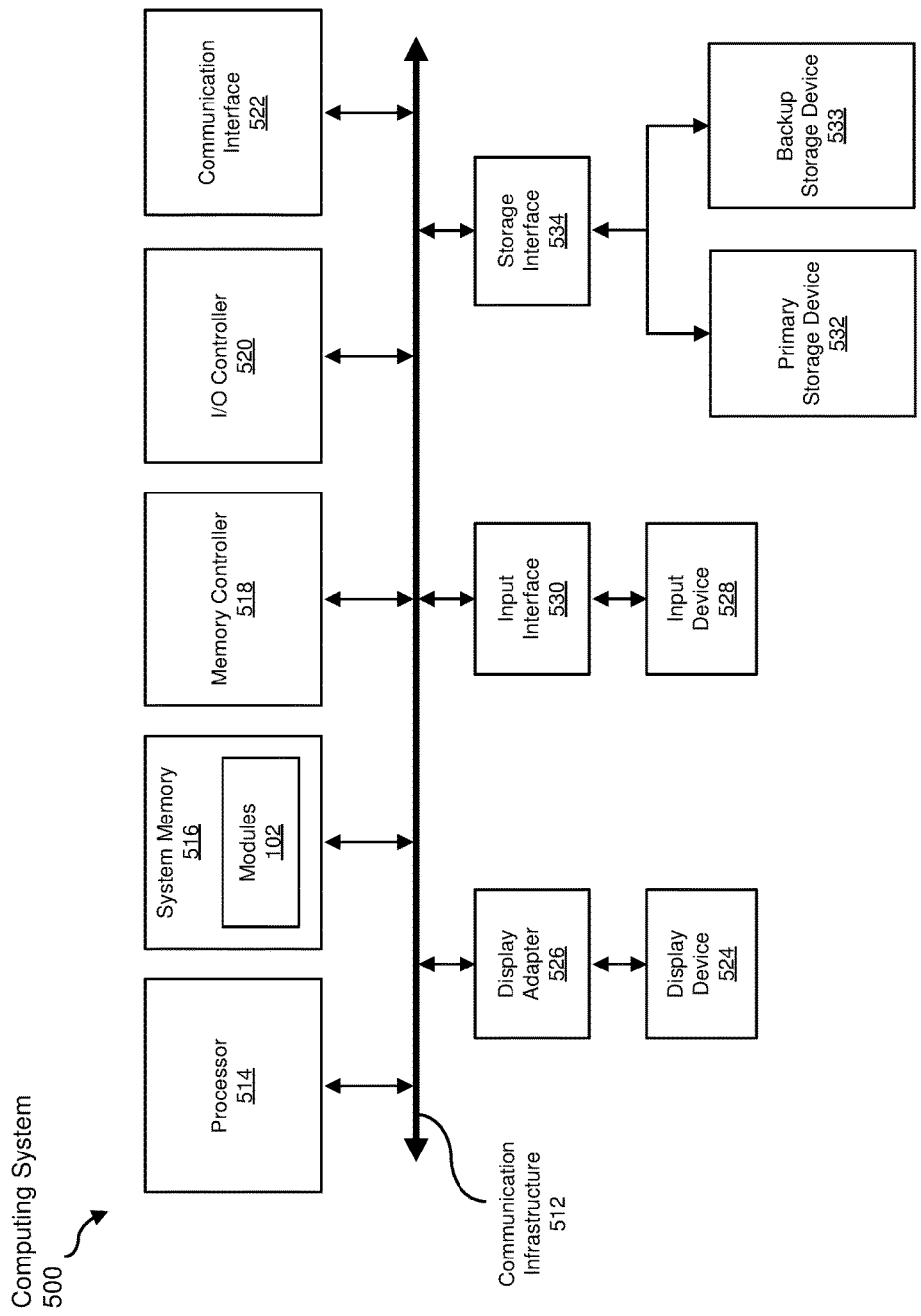
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include and/or represent an apparatus that performs and/or constitutes a means for performing and/or implementing any other steps, methods, or processes described and/or illustrated herein.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    establishing a communication session between a plurality of network nodes to enable the plurality of network nodes to exchange route updates with one another;
    providing, by one of the network nodes, at least a portion of an adaptive compression algorithm to another one of the network nodes;
    notifying the other network node of a window size of the adaptive compression algorithm;
    during the communication session:
        detecting, at the network node, at least one route update to send to the other network node;
        identifying a minimum threshold that represents a certain amount of data needed to apply the adaptive compression algorithm;
        determining that the route update does not yet reach the certain amount of data required by the minimum threshold;
        waiting until the certain amount of data is reached in connection with the route update; and
        once the certain amount of data is reached in connection with the route update, compressing, at the network node, the route update to reduce an amount of data included in the route update by:
            identifying a certain pattern of data included in the route update; and
            applying, to the route update, the adaptive compression algorithm with the notified window size to remove the certain pattern of data from the route update; and
        upon compressing the route update, sending the compressed route update to the other network node to enable the other network node to forward traffic along a path whose route is advertised in the compressed route update.

2. The method of claim 1, wherein applying the adaptive compression algorithm to the route update comprises replacing the certain pattern of data with a smaller representation of data that:
    conveys information that, upon decompression, is identical to the certain pattern of data; and
    includes a fewer number of bytes than the certain pattern of data.

3. The method of claim 1, wherein sending the compressed route update to the other network node comprises enabling the other network node to modify the adaptive compression algorithm based at least in part on the route update.

4. The method of claim 1, further comprising:
    detecting, at the network node, at least one additional route update to send to the other network node;
    compressing, at the network node, the additional route update to reduce an amount of data included in the additional route update;
    determining that the compression of the additional route update results in a failure that causes the additional route update to exceed a maximum threshold; and
    in response to determining that the compression of the additional route update results in the failure:
        sending the additional route update without any compression to the other network node to enable the other network node to forward traffic along a path whose route is advertised in the additional route update; and
        sending a reset for the adaptive compression algorithm to the other network node in connection with a next compressed route update.

5. The method of claim 1, further comprising:
    measuring a compression ratio of the adaptive compression algorithm;
    detecting, at the network node, at least one additional route update to send to the other network node;
    determining that an amount of data included in the additional route update exceeds a maximum threshold due at least in part to the compression ratio; and
    in response to determining that the amount of data exceeds the maximum threshold:
        refusing to compress the additional route update; and
        sending the additional route update without any compression to the other network node to enable the other network node to forward traffic along a path whose route is advertised in the additional route update.

6. The method of claim 1, further comprising:
    detecting, at the network node, a keepalive message to send to the other network node;
    refusing to compress the keepalive message; and
    sending the keepalive message without any compression to the other network node to ensure that:
        the keepalive message reaches the other network node on time; and
        the keepalive message facilitates continuation of the communication session.

7. The method of claim 1, further comprising:
    determining that a certain amount of data is exchanged between the plurality of network nodes during the communication session; and
    determining that the certain amount of data exchanged between the plurality of network nodes exceeds a maximum threshold; and
    wherein compressing the route update comprises compressing the route update in response to determining that the certain amount of data exchanged between the plurality of network nodes exceeds the maximum threshold.

8. The method of claim 1, wherein detecting the route update comprises:

determining that the amount of data included in the route update exceeds a maximum message size of a communication protocol used in the communication session; and in response to determining that the amount of data included in the route update exceeds the maximum message size, splitting the data included in the route update into a plurality of messages of the communication protocol.

9. The method of claim 8, wherein the plurality of messages of the communication protocol comprise:
a first message of the communication protocol; and
a second message of the communication protocol;
further comprising setting a flag of the first message of the communication protocol to indicate that the route update has been split into the first message and the second message; and
wherein sending the compressed route update to the other network node comprises sending the first message to the other network node prior to sending the second message to the other network node.

10. The method of claim 1, wherein:
the route update comprises a plurality of route updates;
compressing the route update comprises:
collecting the plurality of route updates; and
compressing the plurality of route updates into a single message; and
sending the compressed route update to the other network node comprises sending the single message that includes the plurality of compressed route updates to the other network node.

11. The method of claim 1, further comprising:
determining that the network node has reached a maximum amount of Input/Output (I/O) throughput; and
determining that the network node has a certain amount of computing power available; and
wherein compressing the route update to reduce an amount of data included in the route update comprises compressing the route update in response to determining that the network node has reached the maximum amount of I/O throughput and the network node has the certain amount of computing power available.

12. A system comprising:
a communication module, stored in memory, that:
establishes a communication session between a plurality of network nodes to enable the plurality of network nodes to exchange route updates with one another;
provides, by one of the network nodes, at least a portion of an adaptive compression algorithm to another one of the network nodes; and
notifies the other network node of a window size of the adaptive compression algorithm;
during the communication session:
a detection module, stored in memory, that:
detects at least one route update to send from the network node to the other network node; and
identifies a minimum threshold that represents a certain amount of data needed to apply the adaptive compression algorithm;
a compression module, stored in memory, that:
determines that the route update does not yet reach the certain amount of data required by the minimum threshold;
waits until the certain amount of data is reached in connection with the route update; and
once the certain amount of data is reached in connection with the route update, compresses the route update to reduce an amount of data included in the route update by:
identifying a certain pattern of data included in the route update; and
applying, to the route update, the adaptive compression algorithm with the notified window size to remove the certain pattern of data from the route update; and
sends the compressed route update to the other network node to enable the other network node to forward traffic along a path whose route is advertised in the compressed route update; and
at least one physical processor that executes the communication module, the detection module, and the compression module.

13. The system of claim 12, wherein the compression module replaces the certain pattern of data with a smaller representation of data that:
conveys information that, upon decompression, is identical to the certain pattern of data; and
includes a fewer number of bytes than the certain pattern of data.

14. An apparatus comprising:
a storage device that stores an adaptive compression algorithm that facilitates removal of certain patterns of data from route updates sent from a network node to another network node;
at least one physical processor communicatively coupled to the storage device, wherein the physical processor:
establishes a communication session between the network node and the other network node to enable the network node and the other network node to exchange route updates with one another;
provides, by the network node, at least a portion of an adaptive compression algorithm to the other network node;
notifies the other network node of a window size of the adaptive compression algorithm;
during the communication session:
detects, at the network node, at least one route update to send to the other network node;
identifies a minimum threshold that represents a certain amount of data needed to apply the adaptive compression algorithm;
determines that the route update does not yet reach the certain amount of data required by the minimum threshold;
waits until the certain amount of data is reached in connection with the route update; and
once the certain amount of data is reached in connection with the route update, compresses, at the network node, the route update to reduce an amount of data included in the route update by:
identifying a certain pattern of data included in the route update; and
applying, to the route update, the adaptive compression algorithm with the notified window size to remove the certain pattern of data from the route update; and
sends the compressed route update to the other network node to enable the other network node to forward traffic along a path whose route is advertised in the compressed route update.

* * * * *